Feb. 16, 1932.  F. W. HENKE, JR  1,845,916
LOCK FOR SPARE WHEELS AND TIRES
Filed March 17, 1930  2 Sheets-Sheet 1
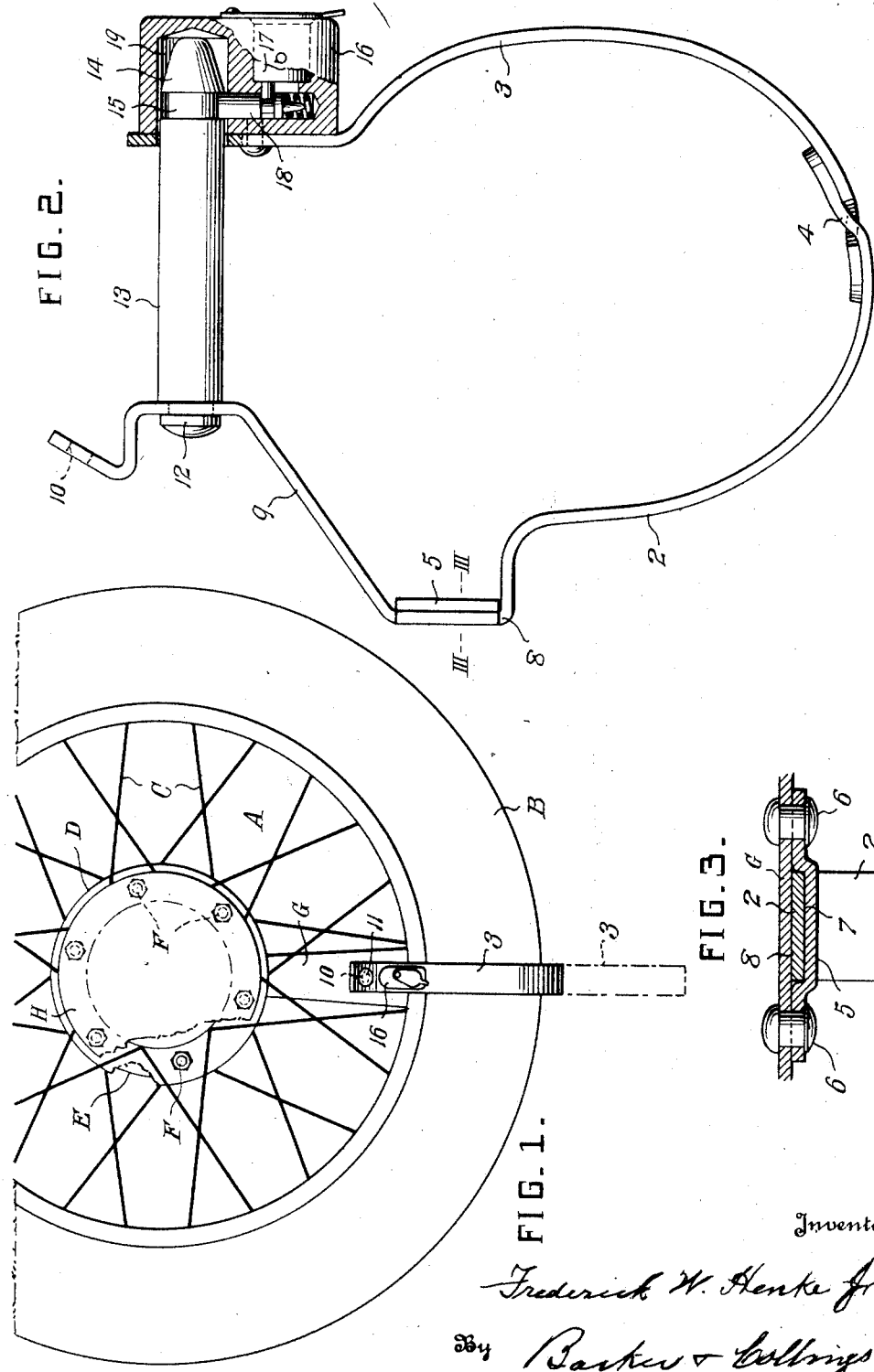
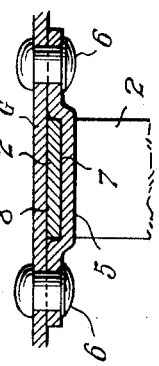
Inventor
Frederick W. Henke Jr.
By Barker & Collings
Attorney Feb. 16, 1932.　　F. W. HENKE, JR　　1,845,916
LOCK FOR SPARE WHEELS AND TIRES
Filed March 17, 1930　　2 Sheets-Sheet 2
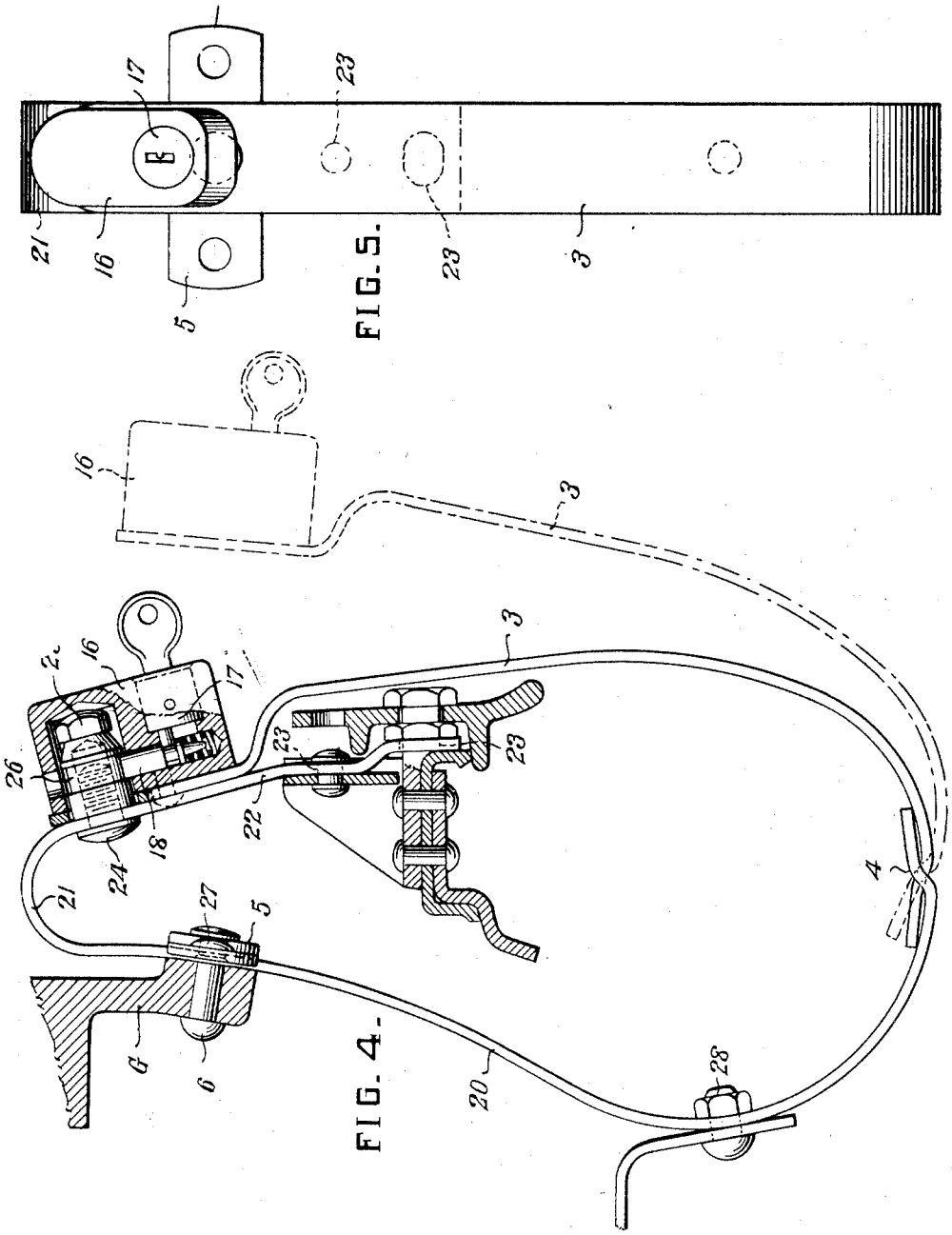

Patented Feb. 16, 1932

1,845,916

UNITED STATES PATENT OFFICE

FREDERICK W. HENKE, JR., OF PHILADELPHIA, PENNSYLVANIA, ASSIGNOR TO FOX AUTOMOTIVE PRODUCTS CORPORATION, OF PHILADELPHIA, PENNSYLVANIA, A CORPORATION OF DELAWARE

LOCK FOR SPARE WHEELS AND TIRES

Application filed March 17, 1930. Serial No. 436,577.

The present invention relates to tire and spare wheel locks of the tire-encircling-band type. It has for its object to provide tire locks that may be used with spoked automobile wheels of present day construction while supported as spares upon the carriers provided therefor at the rear of automobiles; and it consists in improvements, to be hereinafter pointed out, whereby the locks may be cheaply manufactured, simplified in construction, easily manipulated, reliable in use, and securely attached either as standard equipment of the car or as an accessory to be applied by the owner.

In the accompanying drawings wherein two forms of the invention are illustrated:

Figure 1 is a front view representing in full lines a spare wheel and tire lock in position to secure a spare spoked wheel upon a car, the open position of the tire lock, to permit removal of the spare wheel, being represented by dotted lines;

Figure 2 is a side view of the tire lock;

Figure 3 is a cross section on the line III—III, Figure 2;

Figure 4 is a side view of another form of the invention; and

Figure 5 is a front view of the tire lock represented in Figure 4.

In the drawings A designates a spare wheel, carrying a tire B, and having spokes C and a hub D. The carrier on which this wheel is supported comprises an attachment plate E, to which the hub of the wheel is united by securing bolts and nuts F, and bracket members G by which the attaching plate is carried and united with the body of the car. These parts may be widely varied in construction and design, the present invention being adapted for use with different makes and models of cars.

The invention is represented as being embodied in metal, tire-encircling, band locks, wherein the band is formed of two sections hinged together; but it will be apparent that it is equally applicable to a single-piece resilient band lock, thus dispensing with the hinge. Both of these forms are well known in the art and are recognized as equivalents, so far as the present invention is concerned.

Referring particularly to Figs. 1, 2 and 3, 2 indicates the section of the tire-encircling band that is attached to the carrier for the spare wheel, and 3 the free, outer, swinging section of the band, these two parts being united by a hinge, designated 4. For attaching the band section 2 to the wheel carrier there is employed a cross clamping plate 5 adapted to be secured to a convenient part of the bracket G of the spare wheel carrier by screws or rivets 6. The cross plate is recessed at 7 to receive the band section 2, which fits the recess as closely as is practicable. The band section 2 is formed with an angular or offset portion 8 that is adapted to rest against the portion of the carrier bracket to which the locking band is attached, the plate 5 crossing the band at such offset portion; this arrangement insuring that the lock shall be properly positioned, relative to the wheel and tire, when applied, and securely held against forces tending to turn the lock, and against its becoming loose. The band 2 is continued beyond the offset 8, as indicated at 9; and since, in the arrangement of the invention illustrated, the tire-encircling band is supported from the tire carrier so as to encircle the lowermost part of the spare wheel and its tire, this end portion extends upwardly, and is so referred to in the specification. It not only extends upwardly but outwardly, that is, away from the body of the car. Through the extension 9 and near its upper end is an aperture 10 to accommodate an attaching screw or bolt 11 that engages with a part of the tire carrier opposite to which the perforated end of such extension lies. It will be understood that the exact shape and length of the extension 9 depends upon the particular make of car and carrier with which the lock is to be used. Different makes and models of cars are provided with carriers of different sizes and constructions, and the locks embodying the present invention are specially designed for use with the carriers of particular makes.

A long pin 13 is riveted or otherwise permanently secured at 12 to the upward and rearward extension 9 of the band, and extends across and inside of the rim of the wheel. The end of the pin is formed into a tapering head 14, back of which is a groove 15.

To the free end of the hinged swinging band section 3 is secured a lock case 16, within which is fitted the barrel of a lock 17 that controls a spring operated bolt 18 adapted to enter the recess or groove 15 in the pin 13, when the parts are brought to locking position, as indicated in full lines in Figure 1. The open position of the wheel lock, indicated by dotted lines in Figure 1, permits the application of a spare wheel to the tire carrier and its removal therefrom. When the wheel is in place on the carrier the lower portion of the tire is between the sections 2 and 3 of the band, and the swinging section 3 thereof may then be closed to locking position as indicated in full lines; and as it is moved into locking position, the end of the pin 13 enters a recess 19 in the lock case 16 and the tapering end of the pin 13 engages with the bolt 18 and forces it back against the action of its spring, until its end comes opposite the groove 15 when it will be forced into the groove and there held until it is retracted by the use of a key fitted into and operating the lock 17.

All the parts of the wheel and tire lock are preferably of hard tool-resisting metal to resist the attacks of those seeking to feloniously remove the tire or the wheel which the lock is intended to protect. The means for attaching the locking band to the wheel carrier—which may be considered as a part of the car—are so located that they cannot be easily reached for attack so long as the wheel is in position upon the carrier.

The pin 13 is a portion of the tire lock assembly with which the key-operated lock engages for holding the band in tire-encircling position. It has heretofore been the usual custom, in band tire locks that encircle the tire, to employ one of the nuts or holding devices F, used to secure the wheel upon the attachment plate E of the tire carrier, as part of the locking mechanism, the lock proper serving to prevent the manipulation of such holding device, either by preventing its turning or covering it so that access may not be had thereto. However, with the use of the wheels—now much in vogue—formed with large hubs D provided with removable plates or caps H that cover and conceal the holding nuts and bolts, it is impractical to use these wheel-securing means in connection with the locking band since they are not accessible. The present invention therefore provides a means, in the form of the pin 13, carried directly by attached section of the tire locking band, to which the movable section 3 of the band is locked, such means having no relation whatever to the means employed for securing the spare wheel to the wheel carrier. The particular form and arrangement of the tire-encircling band and of the pin 13 carried thereby, illustrated in Figs. 1 and 2, has particular advantages. However, the invention is not limited to this particular form or embodiment.

In Figs. 4 and 5 there is shown another form of lock differing in some respects from that which has been described, while in others it is similar thereto, and so similar reference characters are applied to similar parts in all the views. Referring to this latter form of the invention, 20 indicates the wheel-carrier-attached portion of the tire-encircling band. It may be attached to the carrier bracket G by a cross plate 5 which may, if desired, be permanently united to the section 20 by a rivet 27. The band section 20 is extended beyond the cross, attaching plate 5 to form a curve or loop 21. The leg of the loop that is opposite to the leg to which the cross plate 5 is applied has projecting from it, in an outward direction, a screw-threaded stud or bolt 24. To this bolt may be applied a special nut 25 in which is formed a peripheral groove 26. This stud 24 and the nut 25 applied thereto take the place of the pin 13 in the form of the invention illustrated in Figs. 1 and 2. The bolt 18 of the lock located within the casing 16 at the end of the swinging section 3 of the band engages with the nut by entering the groove 26 therein and thus locks the two parts of the band together in the tire-encircling position.

The special nut 25 is employed because it is well adapted for use in the situation shown. It is a special article described and claimed in application for patent Ser. No. 285,079, filed by Frederick W. Henke, Jr.

The free end 22 or the loop extension of the carrier-attached portion of the band projects downwardly for some distance beyond the stud or screw 24, as represented at 22, in Fig. 4, and is perforated as at 23. These perforations are provided to receive attaching bolts or rivets that may be employed in fastening the locking band to a convenient part of the tire carrier. It will be seen from the foregoing taken in connection with the drawings, that the band section 20 may be secured to the tire carrier either by the plate 5, or by bolts passing through the opening 23, or by both of these means of attachment employed at the same time. On some makes or models of cars the tire carrier is constructed so as to have parts that are in position to receive one attachment, while on other models parts are adapted to receive the other attaching means, and on still other models the carriers have parts where both forms of attaching means may be employed.

In this specification and the accompanying claims, for convenience of description, the encircling band is spoken of as having upper and lower ends and parts. In employing these terms the "lower end" refers to the portion of the band that is radially most distant from the center of the wheel, and the "upper end" refers to that portion which is radially nearest the center of the wheel and is inside the tire and wheel rim on which the tire is supported. It is with this understanding that the said terms are employed, and they are not intended as in any way limiting in the application or use of the band or having reference to the horizon as a standard. The terms, however, are appropriately used when the lock is attached to the lower portion of the carrier, as is usually the case, and therefore correctly describe the lock when supported as indicated in the drawings.

What is claimed is:

1. The combination, with a spare wheel carrier which comprises a central attachment plate for the wheel hub and bracket parts carrying the attachment plate, and means by which a spare wheel is secured at the hub to the attachment plate; of a band lock that encircles the tire for preventing unauthorized removal of the wheel or the tire from the carrier, means for attaching the band lock to the bracket portion of the carrier, the free section of the band carrying a lock, and the carrier-attached portion extending upwardly beyond the place of attachment to the carrier, and a projection carried by the upper portion of the attached part of the band, and independent of the means by which the hub portion of the wheel is secured to the carrier, arranged to be engaged by the lock to securely close the band around the tire while supported upon the carrier.

2. A band lock for spare wheels and tires, adapted to encircle the tire of a wheel while supported on the spare wheel carrier, comprising means for engaging with the band between its ends to secure the band to the carrier, the band being constructed so as to open to permit the application of the wheel to the carrier and its removal therefrom, the free end of the band carrying a lock, and a projection extending outwardly from the upper portion of the band and across the tire and wheel rim on the inner side of the latter, between the wheel hub and the rim, the lock being arranged to engage with the said projection to close the band in position encircling the tire.

3. The combination of a band adapted to encircle the tire of an automobile while supported as a spare upon a wheel carrier, a cross attaching plate adapted to engage with the inner section of the band between its ends and to secure the same to the carrier, the said attached section of the band extending beyond the attaching plate and constructed to permit further attachment thereof to the carrier, a lock carried by the free outer section of the band, and a forwardly extending projection with which the lock may be made to engage to securely close the band about the carrier, the projection being carried by the attached section of the band and located inside the circle of the tire and outside of the periphery of the hub.

4. The combination, with a spare wheel carrier provided with a central attachment plate and bracket parts carrying the plate; of a lock for a spare wheel and tire, of the tire-encircling, band type, an attachment plate adapted to be united to a part of the bracket of the tire carrier, said plate being recessed to fit the inner section of the band, between its ends, thus securely uniting it to the bracket, the band having a portion that extends beyond the attachment plate and also beyond the rim of the wheel, and means whereby the said extension of the band and the free unattached end thereof may be united when brought together to close the band about the tire of a wheel supported by the carrier.

5. The combination, with a spare wheel carrier having a central attachment plate for the wheel hub and bracket parts supporting such plate; of a band arranged to encircle the tire of a wheel mounted on the carrier, means for securing the band directly to a bracket part of the carrier, the attached part of the band extending upwardly beyond the attachment means, a pin carried by the said extension of the attached part of the band extending forward on the inside of the wheel rim and a lock carried by the free outer portion of the band adapted to have locking engagement with the said pin to hold the band in closed position encircling a tire upon a wheel supported by the carrier.

6. The combination, with a spare wheel carrier having a central attachment plate for the wheel hub and bracket parts supporting such plate; of a band arranged to encircle the tire of a wheel mounted on the carrier, means for securing the inner section of the band directly to a bracket part of the carrier, the attached part of the band extending beyond the said attachment means and constructed to permit further direct attachment of the said band extension with the wheel carrier, and cooperating means, carried respectively by the said extension of the attached part of the band, and the free outer portion of the band, said cooperating means being arranged to lock together when the band is closed about the tire of a wheel supported on the carrier.

7. The combination, with a spare wheel carrier having a central attachment plate for the wheel hub and bracket parts supporting such plate; of a band arranged to encircle the tire of a wheel mounted on the carrier, means for securing the inner section of the band directly to a bracket part of the carrier, at a point between the ends of the band, the attached part of the band extending upwardly beyond the said attachment means, a projection extending outwardly, carried by the said upwardly extending portion of the band and located within the circle of the wheel rim, and a lock carried by the free outer section of the band arranged to have locking engagement with the said projection when the band is closed to encircle a tire supported upon the carrier.

In testimony whereof I affix my signature.

FREDERICK W. HENKE, Jr.